W. H. MULLINS.
AUTOMOBILE MUD GUARD.
APPLICATION FILED MAR. 9, 1911.
1,107,826.
Patented Aug. 18, 1914.
2 SHEETS—SHEET 1.
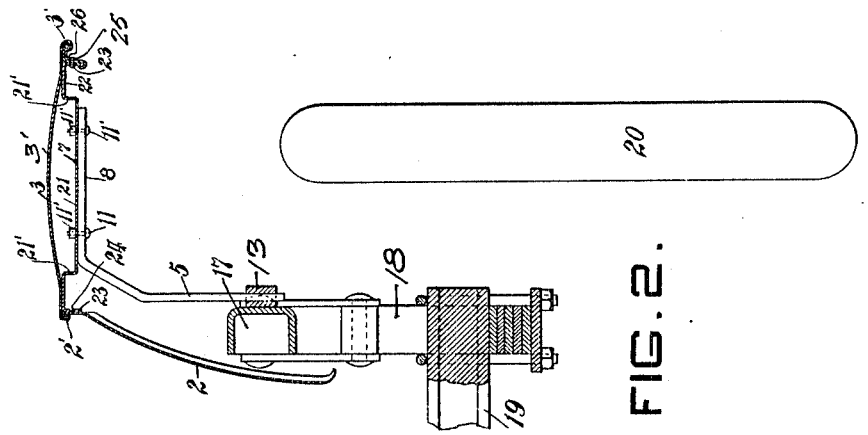
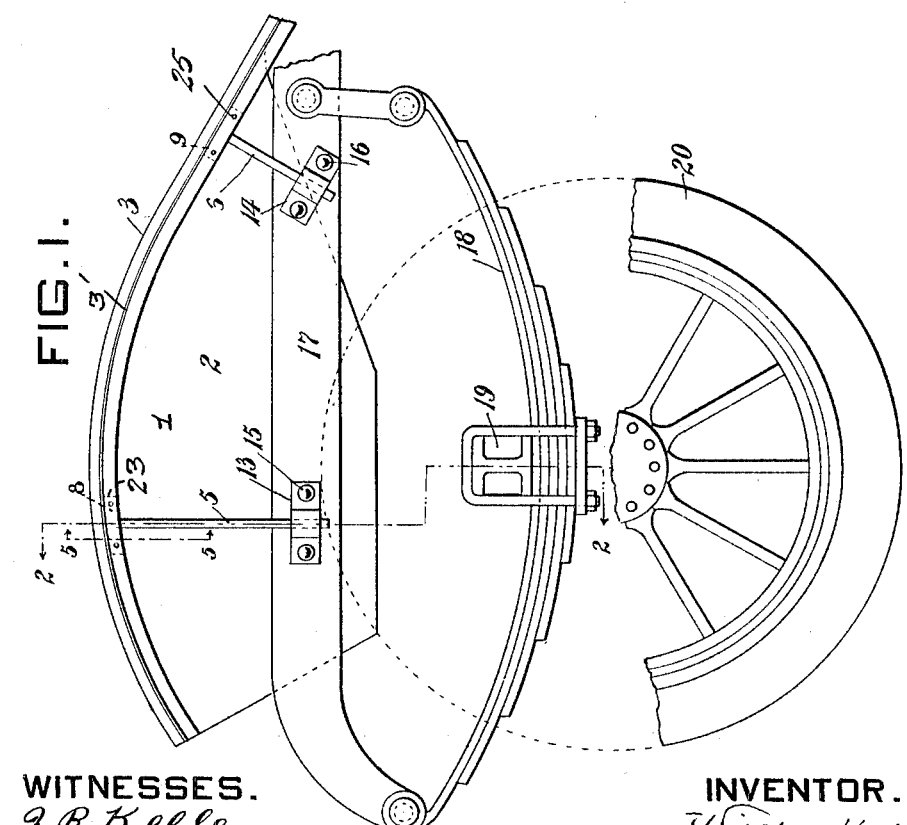
WITNESSES.
J. R. Keller
Robert C. Totten
INVENTOR.
William H. Mullins
By Kay & Totten
Attorneys

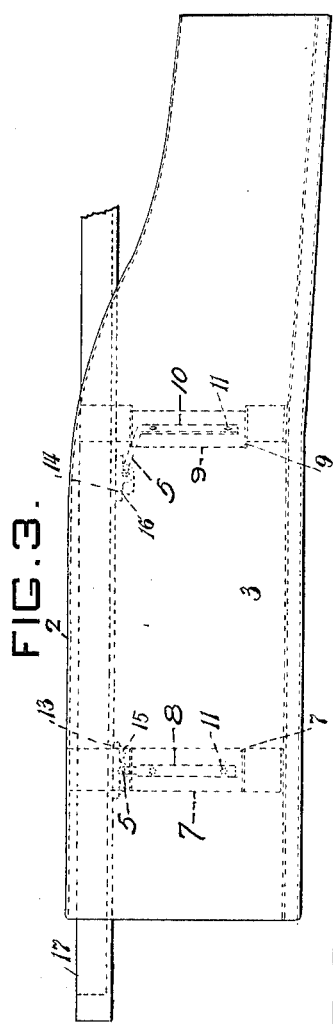

UNITED STATES PATENT OFFICE.

WILLIAM H. MULLINS, OF SALEM, OHIO.

AUTOMOBILE MUD-GUARD.

1,107,826.           Specification of Letters Patent.       Patented Aug. 18, 1914.

Application filed March 9, 1911. Serial No. 613,366.

*To all whom it may concern:*

Be it known that I, WILLIAM H. MULLINS, a citizen of the United States, resident of Salem, in the county of Columbiana and State of Ohio, have invented a new and useful Improvement in Automobile Mud-Guards; and I do hereby declare the following to be a full, clear, and exact description thereof.

My invention relates to mud guards, and particularly to those of the type employed in motor vehicles. Its object is to provide an improved mud guard construction which comprises a mud guard proper of sightly appearance and convenient strength that can at the same time be readily removed from its support upon the vehicle body.

In the automobile mud guards hitherto in general use, the mud guard proper or wall portion is supported upon one or more arms or rods permanently fastened as by metallic straps to the chassis, the top or cover portion of the guard-wall above the wheel being bolted or riveted to horizontally extending arms of the supporting rods. This construction entails the bending or bruising of the light metal such as aluminum of the guard-wall, as well as the rusting of the rivets or bolts, due to cracks in the paint about their heads. It also practically precludes removal of the guard-wall without mutilating the same, as the rod supports are necessarily inconveniently accessible and permanently attached even in the case of the forward mud guard, in so far as removal without mutilating the paint or enamel of the vehicle and the expenditure of considerable time and trouble is concerned; and the guard-wall cannot be removed from the supporting arms or rods without prying open the rivet heads; or, even if bolts and nuts were used, without mutilating the paint or enamel of the guard-wall.

By my invention, I provide a mud guard which has a readily removable guard-wall and which at the same time dispenses with the rivet heads on the top thereof, thereby providing a mud guard having an improved distinctive appearance. This appearance cannot be obtained by use of removable screws to attach the rods directly to the top guard-wall, and furthermore, the thin metal thereof would be subject to bending and mutilation thereby, and rust would set in around the same.

My invention therefore consists, generally stated, in providing in combination with one or more supporting rods attached to the chassis or body of the motor or like vehicle, a mud guard-wall proper having the usual vertical or inside portion and a cover portion above the wheel and rigid with said vertical portion and supporting said cover portion upon the bracket rod by means of a connecting member permanently attached, as by welding, to the guard-wall, and removably fastened, as by separately removable screws or bolts, to the supporting rods. I thus obtain an unweakened cover guard-wall having an improved appearance by the use of this member, which I preferably embody in the special form of a plate having a depending portion spacing the guard-wall above the horizontally disposed rod arm and fastened to the arm by removable screws or bolts, and portions in supporting contact with a lower face of the cover guard-wall and attached to the guard-wall preferably by depending flanges spot-welded or countersunkenly riveted to the top of the inside guard-wall and a depending flange on the outside guard-wall, respectively. This plate may also serve as a strut or brace for that portion of the mud guard which is spans.

In the accompanying illustrative drawings, I have illustrated my invention as applied to the forward mud guard of an automobile, although it will be understood that with slight modification easily appreciated by persons skilled in the art, my invention is likewise applicable to the rear wheels of an automobile, or indeed to vehicles of other types.

In the said drawings, Figure 1 is a fragmental side view of a forward portion of an automobile showing a mud guard of my invention. Fig. 2 is a front view partly in vertical section of the same. Fig. 3 is a top view of the mud guard illustrated in said figures. Fig. 4 is an inside perspective view of the same. Figs. 5 and 6 are detail transverse sections on a larger scale, showing different ways of securing the bracket to the guard-wall.

The mud guard 1 illustrated comprises the inside or vertical wall 2 and the curved cover wall 3 rigid therewith, the side walls being conveniently constructed of sheet metal and rigidly attached to each other as by the interlocking beads 2', 3'. The cover wall 3 extends in substantially horizontal direction transversely of the automobile and is supported upon the bracket rods 5 by means of the connecting member 7 permanently secured to the mud guard and removably fastened to the horizontally extending arm 8 of said rod 5. The rod 6 likewise supports a connecting member 9 of like construction removably fastened to the sidewise extending arm 10 thereof by the screws 11, as illustrated in Figs. 3 and 4; these connecting members may be of any suitable construction and permanently attached in any suitable way to the mud guard. They act as brackets or gusset plates, and in their preferred construction form spacing members between the cover 3 and bracket-rod. The supporting rods 5, 6 are each attached, as by the straps 13, 14 and bolts 15, 16, respectively, to the side sill or member 17 of the vehicle chassis. The chassis or side member 17 thereof is shown supported in a usual manner upon the elliptical spring 18 carried by the axle 19 of the wheels 20. The cover or top guard-wall 3 has an upper face 3' of smooth contour unbroken by any attaching rivets or screws. The entire mud guard 1, however, is supported by the rods 5, 6 and spacing gusset plates 7 and 9 beneath the cover wall 3. The gusset plates or struts are each provided with portions in supporting contact with a cover plate 3 and with one or more depending portions in supporting contact with each of the bracket rod arms 8, 10. The depending portion 21 of the gusset plate 7 is provided as a mid portion carried downwardly by the integral depending flanges 21' from the end contact portions 22 of the said gusset plate 7. The end contact portions 22 have the depending flanges 23, the inner of said flanges 23 being attached to the inside guard-wall 2, and the outer of said flanges 23 being attached to the outside depending flange 26 of the cover wall 3, as illustrated.

The guard-wall is preferably fastened to the member 7 by electric welding, so as to make the joint entirely invisible, although countersunk rivets or even short projecting rivet heads may be employed if found convenient, especially where the guard-wall is of aluminum or other non-ferrous metal, as the joint is in no case visible through the top cover wall 3. In the drawings I have illustrated simple spot welds at 24 and rivets at 25 between the end flanges 23 of the gusset member 7 and the inside guard-wall 2 and inside depending flange 26, respectively. In Fig. 6 I have illustrated the bracket 30 secured directly to the cover 31 of the mud guard such as by electric welding. The bracket has the depending mud portion 32, and the contacting portion 23, fitting against the under face of the cover and welded thereto.

The screws 11 extending through the horizontal arm 8 and nuts 11' within the space 21' constitute a simple and easily accessible removable means for securely attaching the connecting member and hence the entire mud guard to the supporting rod 5, although it will be understood that suitable fastening means such as bolts or clamps, may be employed without departing from my invention as defined in the accompanying claims. The screws 11 after being freely removable in themselves may be readily replaced if damaged in any manner without mutilating either the mud guard wall or the supporting bracket rod. In the said claims also, where I have used the terms "horizontal arm" or "vertical wall" and the like, it will be understood that the parts are so described for identification merely, and are not to be limited to any exact form of construction.

What I claim is:

1. In an automobile mud guard, the combination with a supporting bracket rod attached to the chassis, of a mud guard having a side wall and a horizontal cover portion, a gusset plate having an upper supporting portion beneath said cover portion and permanently fastened to said side wall and to the outer edge of said cover portion and having a depending portion spaced from said cover portion and separately removable screws holding said gusset plate to said bracket rod rendered accessible between said cover portion and said depending portion by said spacing.

2. In automobile mud guards, the combination with a supporting bracket rod attached to the chassis, and having a horizontally disposed arm, of a mud guard comprising an upwardly extending side portion, and a top cover portion rigid therewith and provided with a depending exterior flange, and a connecting and strut member spaced from said cover portion having end flanges permanently fastened to said depending flange and side portion of said wall.

3. In automobile mud guards, the combination with a supporting bracket rod attached to the chassis and having an upwardly extending portion and a horizontally extending arm, of a mud guard comprising an upwardly extending portion at the inner side of said rod, a cover portion rigid therewith above the horizontally disposed arm, an exterior depending flange rigid with said cover portion, and a connecting member having depending end flanges attached to said flange and said upwardly extending portion, respectively, and a depending mid portion, and removable fastening means between the same and said arm.

In testimony whereof, I, the said WILLIAM H. MULLINS, have hereunto set my hand.

WILLIAM H. MULLINS.

Witnesses:
W. P. CARPENTER,
B. E. KYLE.